(12) United States Patent
Faessler et al.

(10) Patent No.: US 10,137,508 B2
(45) Date of Patent: Nov. 27, 2018

(54) MINIATURIZED DEBURRING AND/OR CHAMFERING TOOL WITH INTERNAL COOLING

(71) Applicant: Heule Werkzeug AG, Balgach (CH)

(72) Inventors: Roman Faessler, Marbach (CH); Harry Studer, Balgach (CH)

(73) Assignee: Heule Werkzeug AG, Balgach (CH)

( * ) Notice: Subject to any disclaimer, the term of this patent is extended or adjusted under 35 U.S.C. 154(b) by 126 days.

(21) Appl. No.: 15/003,588

(22) Filed: Jan. 21, 2016

(65) Prior Publication Data

US 2016/0214185 A1 Jul. 28, 2016

(30) Foreign Application Priority Data

Jan. 22, 2015 (DE) .......................... 10 2015 000 797

(51) Int. Cl.
| | |
|---|---|
| *B23B 51/10* | (2006.01) |
| *B23B 51/06* | (2006.01) |
| *B23D 79/02* | (2006.01) |

(52) U.S. Cl.
CPC ............ *B23B 51/102* (2013.01); *B23B 51/06* (2013.01); *B23B 51/101* (2013.01);
(Continued)

(58) Field of Classification Search
CPC ..... B23B 51/06; B23B 51/101; B23B 51/102; Y10S 408/714; Y10T 408/44;
(Continued)

(56) References Cited

U.S. PATENT DOCUMENTS 2,817,983 A * 12/1957 Mossberg ............... B23B 51/06
408/144
4,086,018 A * 4/1978 Robinson .............. B23B 51/101
408/147
(Continued)

FOREIGN PATENT DOCUMENTS

| DE | 10215004 | 10/2003 |
|---|---|---|
| DE | 10333194 | 2/2005 |

(Continued)

OTHER PUBLICATIONS

German Search Report from corresponding German Application 10 2015 000 797.1, dated Feb. 25, 2015, 7 pages.
(Continued)

*Primary Examiner* — Eric A Gates
(74) *Attorney, Agent, or Firm* — Wood Herron & Evans LLP

(57) ABSTRACT

Miniaturized deburring and/or chamfering tool with a cylindrical guide sleeve (2) in which a blade holder base body (5) is arranged in an exchangeable manner, which has at least one receiving slot (20) for receiving and guiding a blade (6) arranged there, which is leaf-shaped and designed so that it can bend along its longitudinal axis, and which, at its free front end, has a cutting head (7) with a deburring or chamfering blade arranged there, wherein an internal cooling of the blade (6) and removal of shavings from the blade (6) are achieved by the fact that the coolant flows around the blade (6) in the receiving slot (20) on at least two facing sides.

12 Claims, 9 Drawing Sheets

(52) U.S. Cl.
CPC ........ *B23D 79/023* (2013.01); *B23B 2220/04* (2013.01); *B23B 2220/08* (2013.01); *B23B 2250/12* (2013.01); *B23B 2251/426* (2013.01); *Y10S 408/714* (2013.01); *Y10T 408/44* (2015.01); *Y10T 408/85* (2015.01); *Y10T 408/865* (2015.01)

(58) Field of Classification Search
CPC ............. Y10T 408/85; Y10T 408/8583; Y10T 408/85843; Y10T 408/865
See application file for complete search history.

(56) References Cited

U.S. PATENT DOCUMENTS

| | | | | |
|---|---|---|---|---|
| 5,277,528 | A * | 1/1994 | Robinson | ............. B23B 51/101 219/69.17 |
| 5,927,911 | A | 7/1999 | Steiner | |
| 8,672,591 | B2 * | 3/2014 | Heule | .................. B23B 51/102 408/147 |
| 9,120,163 | B2 * | 9/2015 | Studer | .................. B23B 51/102 |
| 2005/0132580 | A1 | 6/2005 | Heule | |
| 2015/0063933 | A1 * | 3/2015 | Faessler | ................ B23B 51/101 408/1 R |

FOREIGN PATENT DOCUMENTS

| | | |
|---|---|---|
| DE | 102011117525 | 5/2013 |
| JP | 2008168386 | 7/2008 |
| JP | 201309460 | 5/2013 |
| JP | 1020130049168 | 5/2013 |
| WO | 96/05925 | 2/1996 |

OTHER PUBLICATIONS

English translation of German Search Report, 13 pages.
Certification of English Translation of German Search Report, dated Jan. 22, 2016, 1 page.
English translation of Japanese Search Report from corresponding Japanese Application 2016-009386, dated Feb. 8, 2017, 5 pages.
Korean Search Report from corresponding Korean Application 10-2015-0170100, dated May 9, 2017, 8 pages.

* cited by examiner

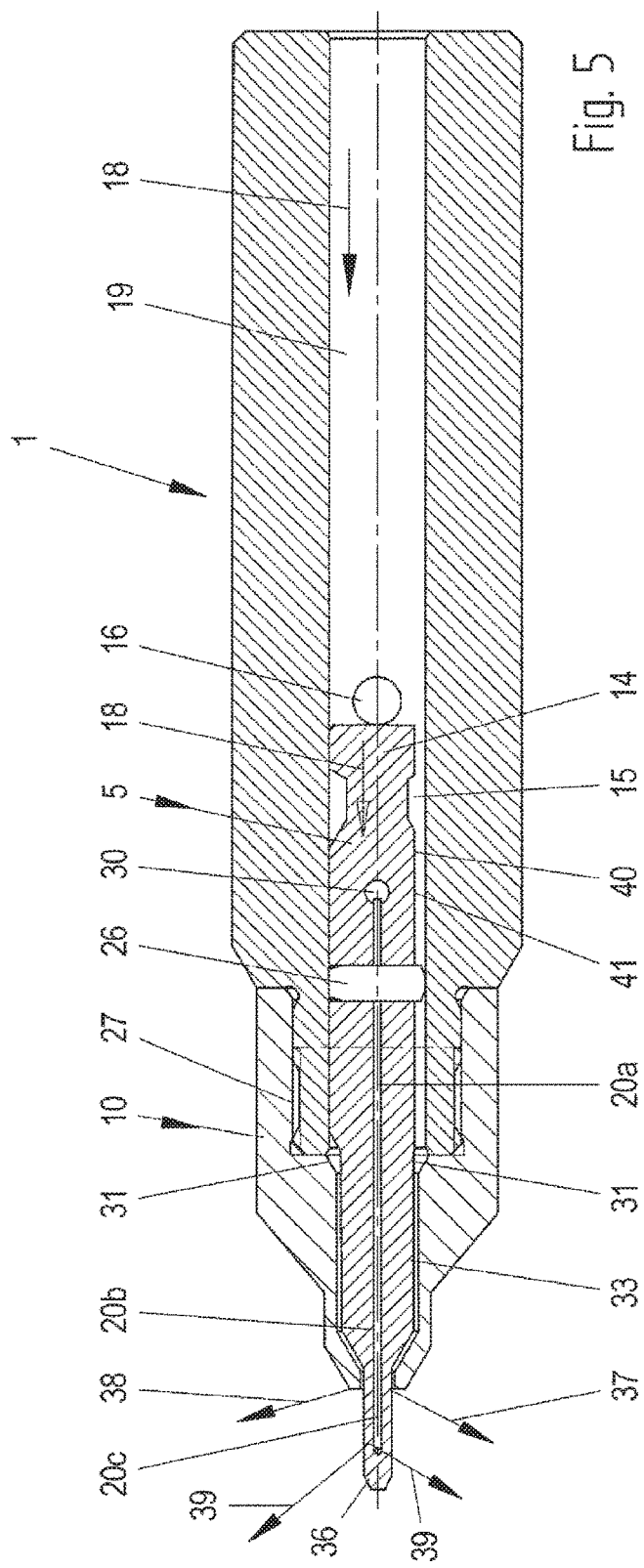
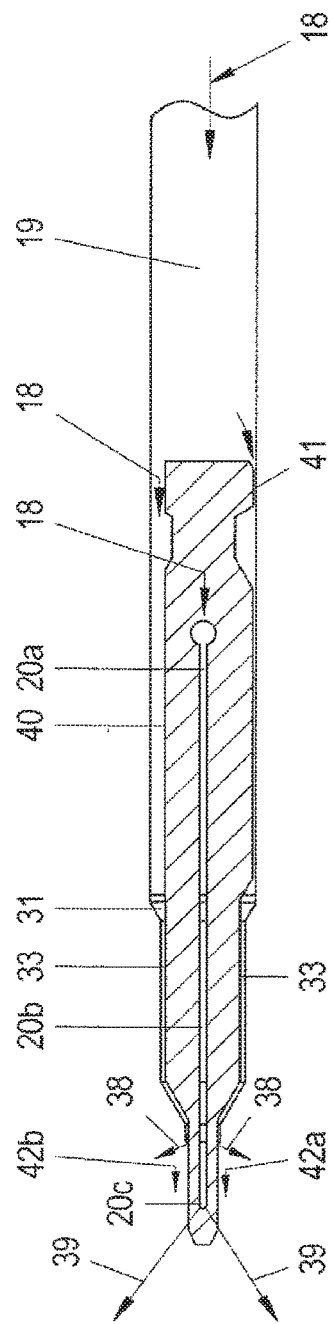

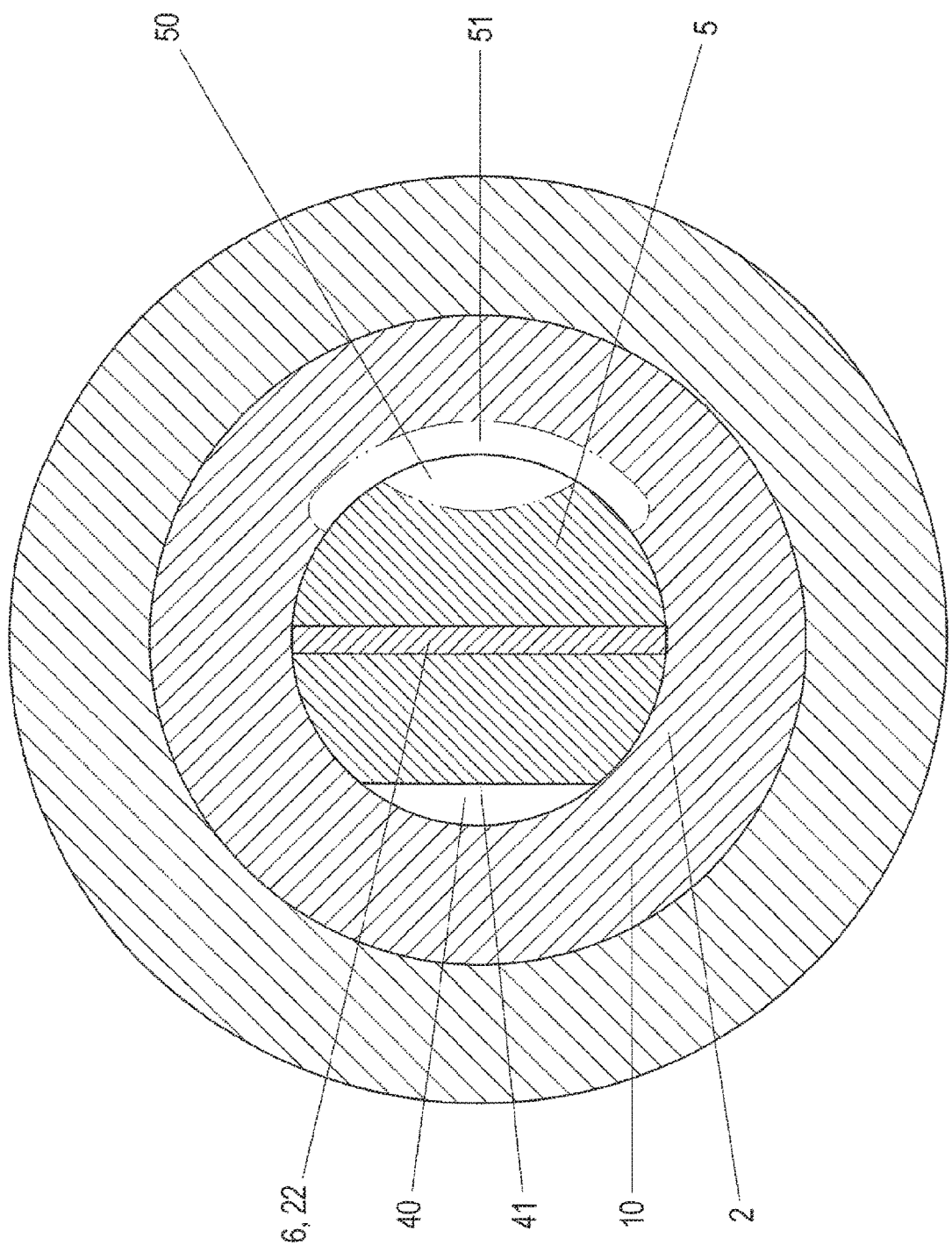

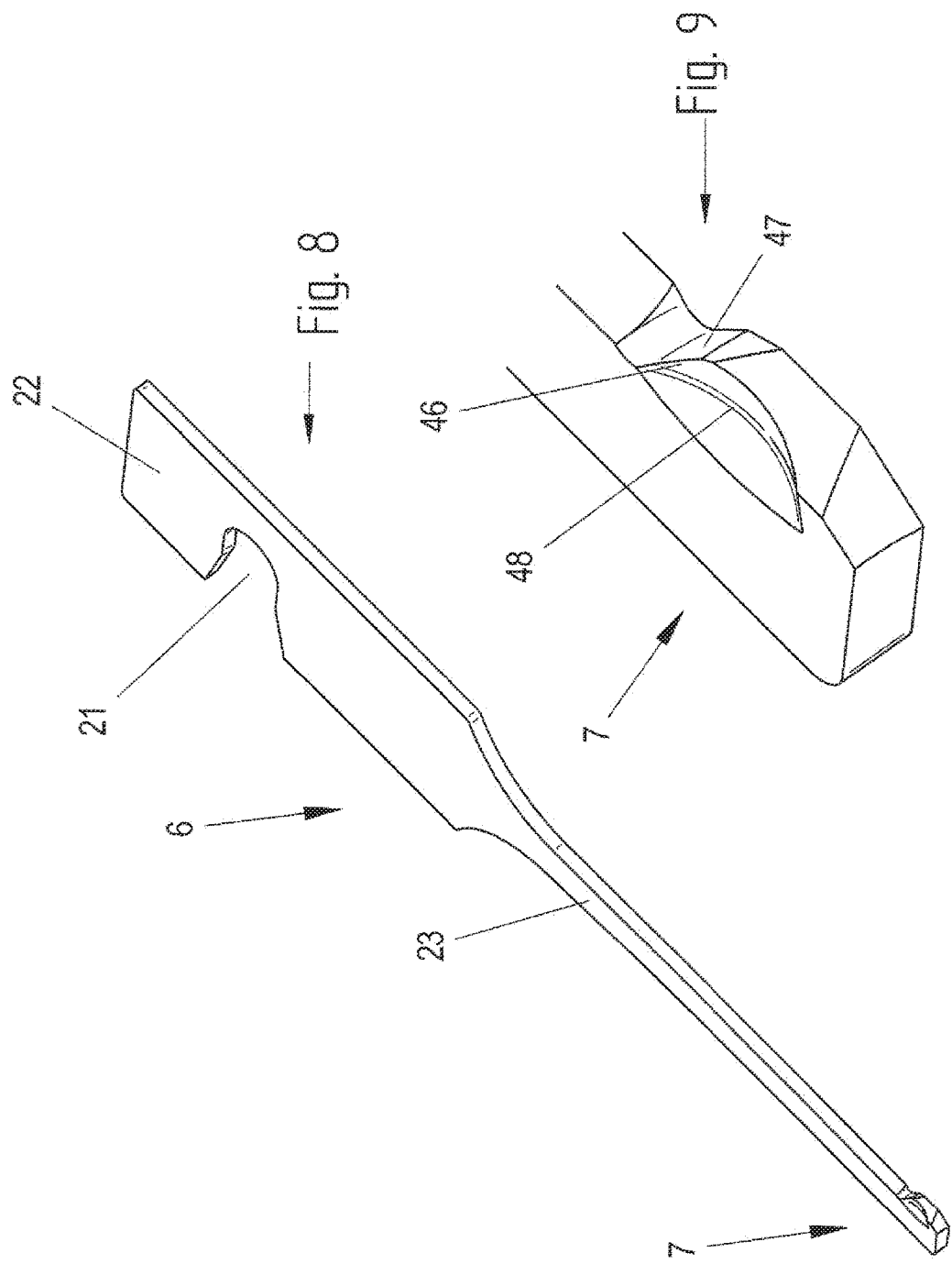

MINIATURIZED DEBURRING AND/OR CHAMFERING TOOL WITH INTERNAL COOLING

The invention relates to a miniaturized deburring and/or chamfering tool with internal cooling. Such a deburring and/or chamfering tool is disclosed, for example, by way of the subject matter of DE 103 33 194 B4.

In such deburring tools as are used, for example, for deburring or for chamfering bore diameters smaller than 4 mm, it has been found that the cooling of the cutting head and/or the removal of shavings from the cutting head is problematic.

It has been observed that the removal of shavings in such miniaturized deburring and chamfering tools is difficult, since, in spite of the miniaturization of the cutting head, relatively large volumes of the shavings are produced. With a cutting head diameter of 1.2 mm, shavings in the range from 0.2 mm to 1 mm are produced.

From this it results that, even in the case of miniaturized cutting heads, relatively large volumes of the shavings are produced, whose length corresponds approximately to the diameter of the cutting head. In addition, a serious problem is associated with the removal of the shavings and the cooling of the miniaturized parts. First, there is a lack of needed dissipation of heat at the miniaturized cutting heads back towards the tool body, and, second, the removal of soiling and shavings is negatively affected in that only small cross sections are present on the tool, in which the moving parts of the cutting apparatus are arranged and guided, and which become filled with shavings and soiling and are additionally difficult to clean. This leads to jamming of the moving parts of the deburring tool, a negative effect on operation and insufficient process reliability.

Deburring tools through which coolant flows are known in numerous designs. In U.S. Pat. No. 5,927,911A1, a deburring tool is described in which the coolant flow flows centrally in the deburring tool in axial direction.

It is directed towards a deburring tool that is swivelably mounted in a horizontal shaft. Due to the mounting of the deburring blade in a horizontal shaft on the front portion of the deburring tool, further miniaturization of the deburring tool is not possible.

The same disadvantage also applies to the deburring tool known from DE 102 15 004 A1. The coolant flow that flows centrally through the deburring tool in axial direction, at the front tip of the deburring tool strikes a deflection surface, which directs the coolant flow in radial direction outward onto the two swivelable deburring blades that face one another. Due to the arrangement of two deburring blades which face one another, each of which being mounted swivelably in horizontal shafts, further miniaturization is not possible.

WO 9605928 A1 describes a deburring blade which is capable of swiveling out due to the action of the centrifugal force, and which is maintained in its swiveled-in position by means of a compression spring. The deburring blade is held in a horizontal shaft, swivelably on the base body of the tool, and the swiveling out is supported by a coolant flow directed onto the deburring blade.

Thus, in all three above-mentioned printed documents, the disadvantage is that the swivel shaft of the respective deburring blade is arranged perpendicularly to the longitudinal axis of the tool.

This prevents further miniaturization of the tool, since the swivel or rotation shaft arranged perpendicularly to the longitudinal axis of the tool requires an installation width needed for construction at the tip of the tool, which as a result cannot be reduced in size.

The invention is therefore based on the problem of further developing a miniaturized deburring and/or chamfering tool of the type mentioned in the introduction, so that the process reliability is increased, and so that sufficient cooling of the cutting head is ensured even in the case of small diameters of the cutting head of less than 2 mm, wherein proper removal of shavings and soiling is ensured.

For the solution to the posed problem, the invention is characterized by the technical teaching of claim 1.

In the case of the invention, the term "miniaturized deburring tool" means that the shaving length generated by the deburring or chamfering tool corresponds approximately to the diameter of the cutting head. The ratio of shaving length to cutting head diameter accordingly is in the range of 1:1 to 1:3. Furthermore, this term is understood to mean that the diameter of the cutting head of the tool is less than 4 millimeters, preferably less than 2 millimeters.

It is an essential feature of the invention that that coolant flows at least partially around and/or through the base body of the tool which receives the deburring or chamfering blade, in the longitudinal direction, and that the deburring blade, designed as leaf-shaped, is movably received in an at least half-open receiving slot of the base body of the blade holder, and that the coolant also flows through the receiving slot.

In the case of the present technical teaching, the resulting advantage is that, for the first time, a miniaturized deburring and/or chamfering tool with an internal cooling by means of a coolant is provided, which ensures a reliable removal of shavings in the area of the machining deburring or chamfering blade. In addition, it is provided that the coolant guidance occurs along the moving parts of the deburring or chamfering blade, so that their working and movement area is cooled and rinsed, and penetration of shavings into this area can be avoided from the start.

It is also provided that coolant flows around the deburring or chamfering blade in its receiving holder for the deburring or chamfering blade, in particular in its receiving slot in the base body of the tool, and is guided in the base body in a longitudinal direction forward up to the cutting head.

As a result of the fact that the deburring or chamfering blade with its swivel shaft is now mounted parallel—and no longer perpendicular—to the longitudinal extent of the blade holder base body, the possibility exists for the first time of miniaturizing the deburring or chamfering tool in comparison to the three above-mentioned deburring tools through which coolant flows. However, due to the parallel guidance of the leaf-shaped deburring or chamfering blade in a receiving slot of the blade holder base body, which extends in axial direction, new problems arise with regard to the cooling and the removal of shavings in such miniaturized tools.

In order to solve these problems, the invention now provides for an additional rinsing of the receiving slot in the blade holder base body, and, at the same time, the leaf-shaped deburring or chamfering blade is exposed to coolant flow from all four sides.

In a preferred embodiment of the invention, a coolant sleeve for guiding the coolant is provided, which, like a sleeve, surrounds the deburring tool known from DE 103 33 194 B4, in the area of the front portion of the tool, thus allowing, on the inner periphery of the tool, a coolant guidance which ensures that the coolant flows in longitudinal direction through the blade receiving slot for the deburring blade in the blade holder base body. At the same time, the deburring or chamfering blade itself is also exposed to coolant, and the coolant flow oriented in longitudinal direction flows over and past the cutting head exposing the cutting head there to flow both in radial and also in axial direction.

The result of the use of axial rinsing of the cutting head is that shavings that collected in the receiving slot of the blade holder base body, and that can have a negative effect on the operation of the blade, are rinsed away and, furthermore, the cutting head itself is rinsed free of adhering shavings.

At the same time, the coolant sleeve at its front passage opening is designed so that a coolant flow in axial direction and also in radial direction is expelled, so that both a radial and also an axial rinsing of the cutting head of the blade is ensured.

By the present technical teaching, an essential increase in process reliability is ensured, and a problem free movement of the deburring blade in the receiving slot of the base body is ensured, since the receiving slot is always rinsed free of shavings and soiling.

In a preferred embodiment, the deburring blade is designed as an elongated leaf-shaped body on whose front free end the cutting head in miniaturized form is arranged. The invention is not limited to this.

Instead of a leaf-shaped blade, which is designed with flexibility, other blade types can also be used such as, for example, a blade that swivels radially from a blade head as disclosed in DE 10 2008 0046 489 A1.

In the invention, the receiving slot for a deburring blade or chamfering blade that is held in a flexible manner is used for the coolant guidance.

Another blade type exists, which has given rise to an industry standard under the term of COFA and which is described in DE 295 19 893 U1. Such a blade type can also be supplied with coolant according to the inventive concept of the invention. In this application case, the spring is arranged in the base body, which is provided for a spring-loaded swiveling out of the deburring blade. The axial spring slot provided in the base body of the tool is accordingly also used for guiding the coolant. Since the spring is one of the moving parts in the tool, the receiving slot is used for receiving the leaf spring as coolant guide, so that the receiving slot is rinsed free of shavings penetrating there.

In the above-described embodiments, the internal cooling of the leaf-shaped, approximately rectangular profiled blade and removal of shavings from the blade are ensured in that the blade in the receiving slot is exposed to the flow of the coolant on all four sides. The two flat sides of the leaf-shaped blade are the surfaces for guiding and mounting on the facing surfaces in the blade holder base body. This results, on these flat sides, in only small flow-through cross sections, which, however, can be enlarged by arranging, either in the flat sides of the blade and/or in the facing guiding surfaces of the blade holder base body, additional fluid-conducting grooves that are oriented in axial direction.

On the mutually facing small sides, large flow-through cross sections are formed in that the height of the blade (the distance between the two small sides of the blade) is smaller than the clear height of the receiving slot.

In addition, it is provided that the blade holder base body is also exposed to coolant flow on all four sides—i.e., in axial direction preferably over its entire periphery—. To the extent that the blade holder base body for alignment and centering is received with small radial play in a neck of the guide sleeve of the tool, flat portions and/or longitudinal grooves are arranged in this area, in the area of the neck and/or the blade holder base body, which allow the coolant to flow through freely.

Other deburring blade types can also be used for the inventive concept, and, in particular, deburring blades which are such that either the spring element is guided in the base body and there is a certain movement play in the base body, or the deburring blade is mounted in a flexible or swivelable manner in the base body itself.

The invention provides that the axial longitudinal slots arranged in the body of a deburring and/or chamfering tool, which are for holding the deburring blade and/or for guiding the spring element, are used for guiding the coolant in the direction towards the cutting head.

Accordingly, the invention is not limited to a deburring blade of the type as represented below in the embodiment examples, instead, it applies to all miniaturized deburring and/or chamfering tools in which for the first time an internal cooling is proposed, internal cooling which consists in that the holding or guiding portions either for the spring element and/or for the deburring blade itself are used for guiding the coolant in the direction onto the cutting head.

The invention relates to another tool, as an additional embodiment example, for deburring and/or for introducing chamfers, which consists essentially of a cylindrical guide sleeve in whose interior a spring element is arranged, which acts on a first holder which is attached in a torque proof manner to a one-armed deburring blade. Such a tool is described in DE 10 2008 046 489 A1 or DE 295 19 893 U1.

It is important that, in the area of the guide sleeve, the holder of the flexible spring is used as a guide channel for the cooling fluid in the direction toward the blade window. This embodies the inventive concept of the invention, since the moving parts of the deburring or chamfering tool are rinsed thoroughly in axial direction by the coolant flow.

Here, the deburring tool is a tool which is intended for deburring bore margins.

A chamfering tool is a tool that is suitable for applying chamfers to bore margins. The present invention includes the two embodiments and, for the sake of simplicity, it is assumed in the following description that there is only one "tool," which accordingly can be designed either as a deburring tool and/or chamfering tool.

Such tools are driven in rotation and have rotational speeds in the range from 800 to 10,000 revolutions per minute.

The smaller the tool is, the more serious the resulting problems of cooling (heat removal) and formation of shavings are.

Therefore, the measures according to the invention are preferably used in miniaturized tools as are available in the bore diameter range of less than 4 mm.

The disclosure content of category-defining DE 103 33 194 B1, DE 10 2008 0046 489 A1 and DE 295 19 893 U1 is to be fully included as content of the present invention description.

The inventive subject matter of the present invention results not only from the subject matter of the individual claims, but also from the combination of the individual claims with one another.

All the indications and features, including the abstract, disclosed in the documents, in particular the spatial design represented in the drawings, are claimed as essential to the invention, to the extent that they are novel individually or in combination in comparison to the prior art.

The invention is explained in further detail below in reference to drawings representing several ways of carrying it out. Here additional features essential to the invention and advantages of the invention are apparent from the drawings and their description.

FIG. 5 shows: a cross section offset by 90° through the tool

FIG. 5a shows: the guidance of the coolant in a simplified representation

FIG. 7 shows: a cross section along line VII-VII in FIG. 3

FIG. 8 shows: a perspective view of a deburring blade

FIG. 9 shows: the enlarged detail view of the cutting head of the deburring blade according to FIG. 8

Figure 1:
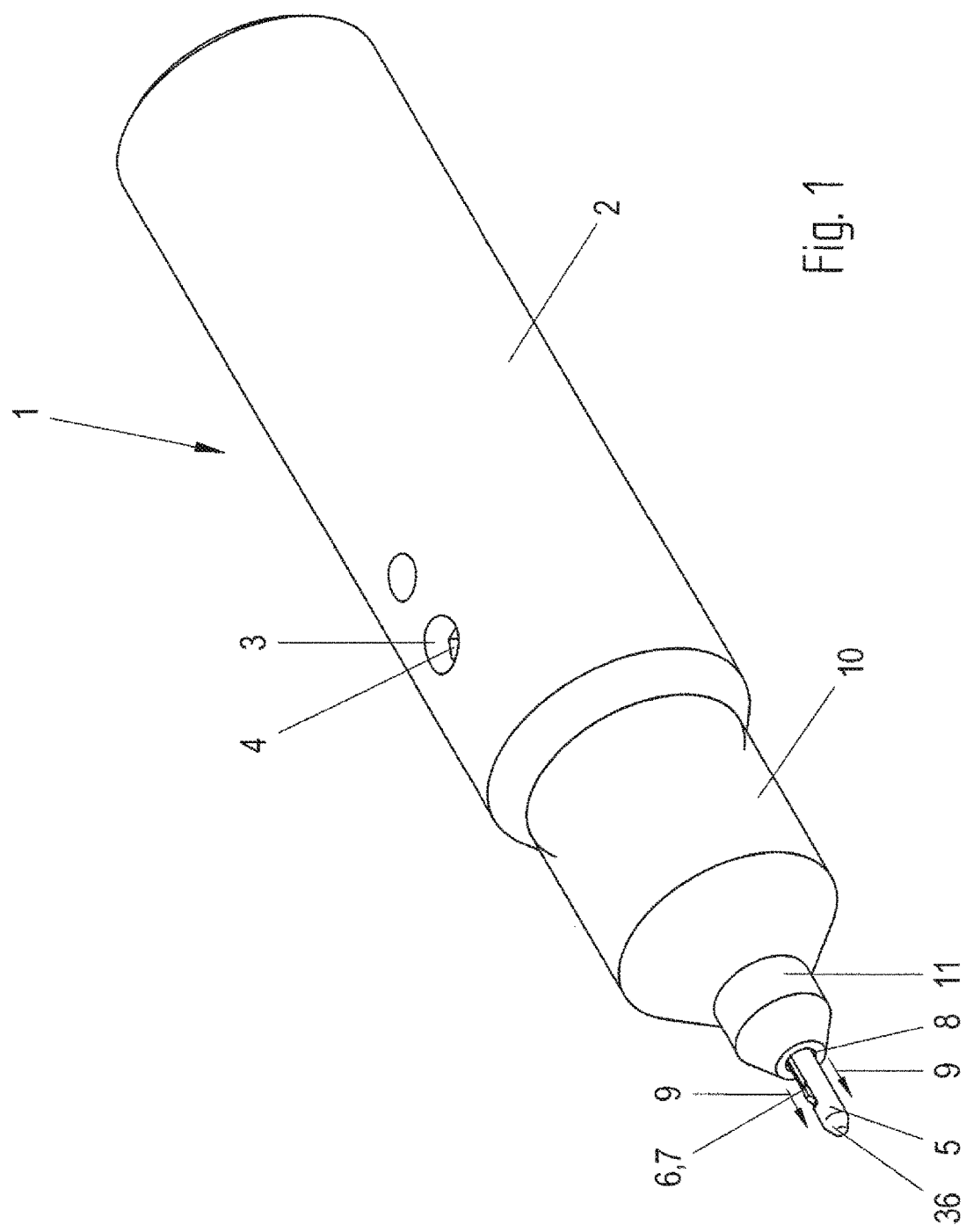
FIG. 1 shows: a perspective view of an embodiment of a deburring blade according to the invention
Figure 10:
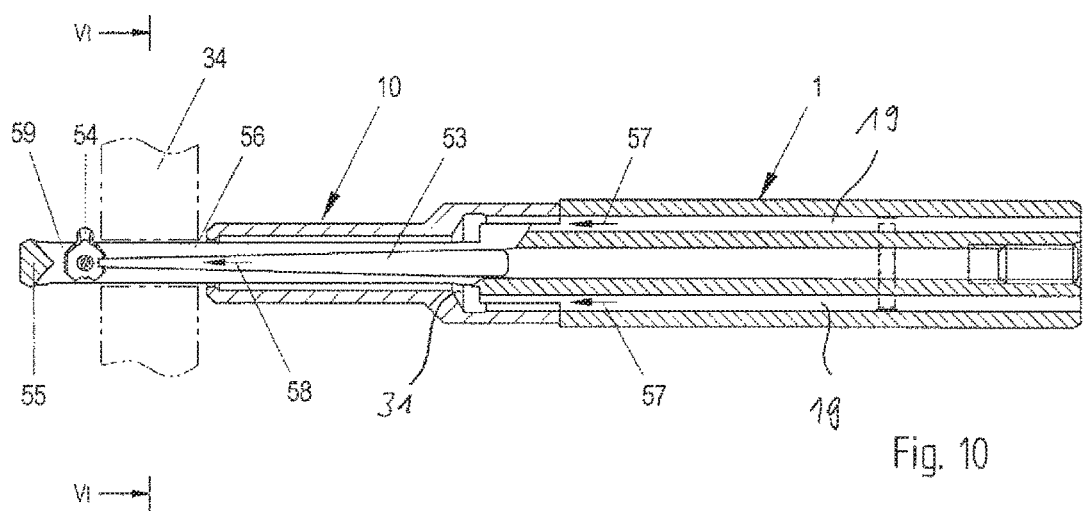

FIG. 10 shows: a diagrammatic representation of another tool for deburring with guidance of the coolant In FIG. 1, in a perspective representation, a first embodiment of a tool 1 is represented, which consists substantially of an approximately round cylindrical guide sleeve 2, on the front end of which a coolant sleeve 10 is arranged, which transitions into a cylindrical neck 11 of reduced diameter.

From the front cylindrical neck 11, the cutting head 7 of the tool 1 protrudes, wherein, in the depicted embodiment, it is still visible that the base body 5 which receives the blade 6 ends in a tip 36, and the coolant flows out of a passage opening 8 arranged at the front end of the neck 11 in axial arrow direction 9 and also in radial direction, and flows through the cutting head 7 with the cutting edges arranged there, keeping it free of shavings and soiling.

It is important that the coolant flows not only over the blade 6, but also through the receiving slot 20 (keyword internal cooling) in which the blade 6 is received.

This will also be discussed further in the later drawings.

It should also be noted that the base body 5 is held with the assistance of a tensioning screw 4, which is screwed into a bore 3 in the guide sleeve 2.

Figure 2:
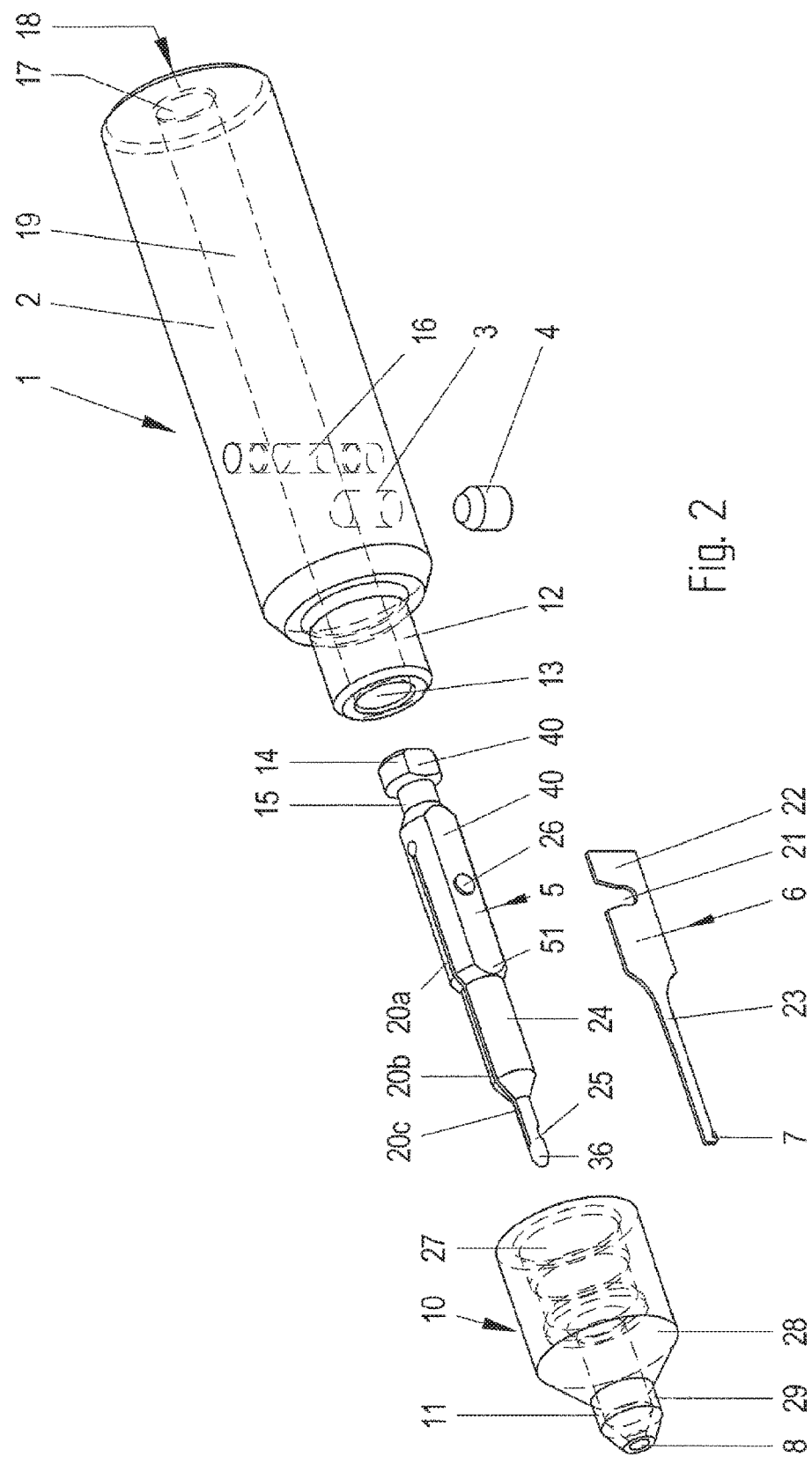
FIG. 2 shows: an exploded type breakdown of the tool according to FIG. 1

FIG. 2 shows an exploded type breakdown of the tool 1 according to FIG. 1.

There, one can see that, in the embodiment example, at the rear end side, the cylindrical guide sleeve 2 has a coolant inlet 17 into which the coolant is led under pressure in arrow direction 18. The invention is not limited to this.

In another embodiment, it is possible to provide that the coolant inlet occurs radially on the outer periphery of the guide sleeve 2 or directly on the coolant sleeve 10 or also in other areas, in particular the cylindrical neck 12 of the guide sleeve 2.

In the depicted embodiment example, one can see, furthermore, that, in the guide sleeve 2, a stop 16 in the form of a transverse bolt is present, so that the base body 5 which receives the deburring blade 6 abuts rearward in axial direction towards the rear.

The coolant channel 19 is preferably arranged in the center of the cylindrical guide sleeve 2. The invention is not limited to this. In addition to the central coolant channel 19 guided in axial direction, it is also possible to provide individual lengthwise bores, ribs or other half-open or closed guide channels for the coolant in direction towards the front end of the guide sleeve 2.

The blade holder base body 5 which receives the blade 6 is also substantially of round cylindrical design and it has a rear attachment neck 14 with which the base body abuts in axial direction rearward against the stop 16.

The attachment neck 14 of larger diameter is adjoined by an annular groove 15 of smaller diameter, in which the tensioning screw 4 engages and thus it attaches the base body 5 exchangeably in axial direction in the guide sleeve 2.

The annular groove 15 of reduced diameter is adjoined by a portion of the base body 5 of a larger diameter, in whose surface a first portion of a receiving slot 20a is provided, which extends from the back through the entire longitudinal extent of the base body 5 forward in the form of the axially extending receiving slots 20b, 20c.

The receiving slot 20 has three subdivisions 20a, 20b, 20c which extend one after the other in axial direction and transition into one another, and which are connected in a fluid conducting manner to one another, and, it continues to the front into the part 25 of reduced diameter which transitions via a conical neck into a part 24 of enlarged diameter, which adjoins in axial direction.

Transversely to the longitudinal extent of the blade holder base body 5, a transverse bolt 26 is arranged, on which the blade 6 having an indentation 21 engages and is securely held axially there against shifting.

In the depicted embodiment example, the blade 6 consists of a leaf-shaped metal part, which is made of a spring material and which consists of a larger rear leaf body 22 in whose area the indentation 21 is arranged.

The leaf body, which has an approximately rectangular cross section and a relative small design, transitions forward into a flexible blade neck 23 of reduced width which adjoins at the front, wherein the cutting head 7 is arranged at the free front end of the blade neck 23.

An enlarged representation of this blade is shown in FIGS. 8 and 9. There, the special geometry of the cutting head is also represented. One can see that the cutting head 7 is formed by a cutting edge 46 which extends at a slant in a first plane and which is adjoined in a second plane by a free surface 47, and the cutting edge 46 in turn transitions into a cutting surface 48 in a third plane.

Thus, the cutting head 7 is suitable for deburring in a certain direction of rotation of the tool, wherein the direction of rotation of the tool is clockwise in the depicted embodiment example.

This relates to a rearward cutting of the cutting head, which depends on the position of the cutting edge 46.

In another embodiment which is not represented in a drawing, it is provided that a forward cutting occurs by means of a cutting edge 46 in different design.

In the same way, the invention is not limited to the arrangement of a single blade 6 as flat blade. Multiple blades can also be arranged in a common base body, in particular two diametrically facing blades 5 in the design in the form of a flat blade.

The base body 5 is also received in the cylindrical accommodation 13 of the guide sleeve 2 and is secured by means of the tensioning screw 4.

Now, it is important that the coolant flowing in arrow direction 18 flows through the cylindrical neck 12 in the guide sleeve 2 and over a first flat portion 40 into the round-cylindrical neck 14 of the blade holder base body 5, which is received therein with little radial play.

On the outer periphery of the blade holder base body 5, a second flat portion 40 is provided, which reduces the diameter in this area and which adjoins the first flat portion 40 in axial alignment in axial direction, so that the coolant flow flows laterally past the blade holder base body 5 and over a conical neck 51 of reduced diameter, which adjoins the second flat portion 40 in axial direction.

The conical neck 51 of decreased diameter forms the outer periphery of the blade holder base body 5 in this area and it transitions coaxially into a cylindrical neck 24, where the coolant reaches a peripherally extending annular space 31 and is distributed there around the entire periphery of the base body 5. The annular space 31 is formed by the inner periphery of a coolant sleeve 10 and the outer periphery of the cylindrical part 24 of the blade holder base body 5.

In order to guide the coolant and to ensure that the coolant does not flow outward in radial direction, a coolant sleeve 10 is provided, which is screwed with an associated receiving thread onto an associated threaded neck on the neck 12 of the guide sleeve 2. Instead of a screw connection, a plug connection or bayonet connection can also be selected.

The coolant sleeve 10 thus completely encloses the base body 5 with the blades 6 held in the receiving slot 20 and it forms only a front, end-side passage opening 8 for the outlet of the coolant.

The coolant sleeve 10 consists substantially of a round cylindrical part, which is made of aluminum, plastic or another suitable material. Starting with a larger diameter, it transitions via a first conical neck 28 into a smaller neck 11, which in turn transitions via an additional conical neck 29 into the front flat side in which the passage opening 8 is arranged.

Figure 3:
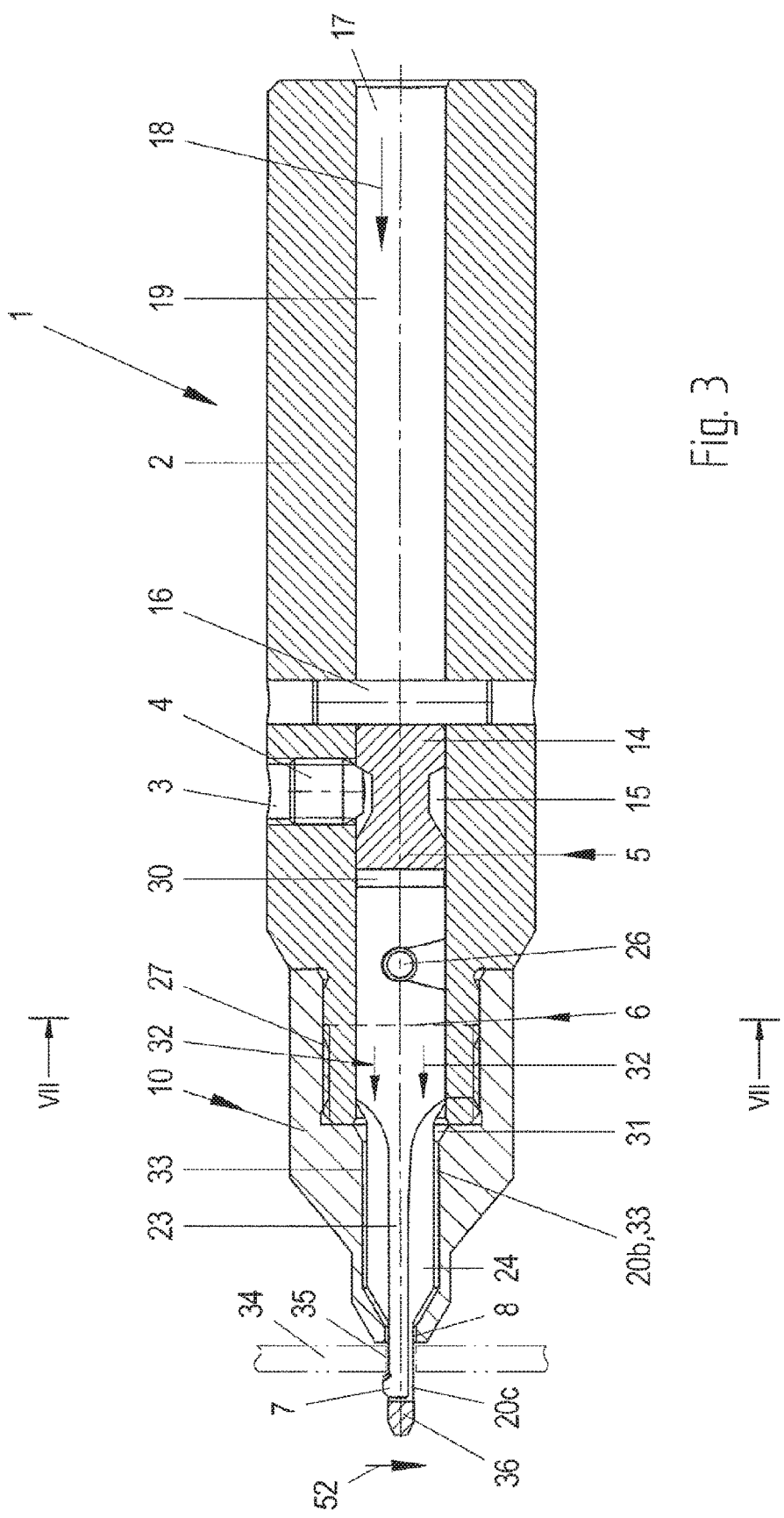
FIG. 3 shows: a section in a first plane of the deburring tool according to FIGS. 1 and 2

FIG. 3 shows a first cross-sectional plane through the tool 1, where one can see that the coolant channel 19 and the coolant guided there in arrow direction 18 flows over the stop 16 and reaches the area of the neck 14 of the base body 5, wherein it is not shown in further detail how the coolant flows past the lower portion of the base body 5. This can only be seen in FIG. 5.

In arrow direction 32 drawn in broken lines, it is shown that the coolant flows along in axial direction in the base body 5 in the receiving slot 20, but also from outside around the base body, so that both an internal and also an external peripheral flow with coolant is provided.

The flow through the receiving slot 20 is explained below in greater detail in reference to FIG. 5.

From FIG. 3, one can see that the outer periphery of the base body 5 is also exposed to flow around it in the area of the flow channels 33 which appear, in longitudinal direction, as a gap between the inner periphery of the coolant sleeve 10 and the outer periphery of the base body 5.

It is only for the sake of completeness that it is also shown that the blade 6 does not abut with its rear axial end against the base body 5, but that it encounters instead a free space 30 there, so that the blade 5 is received almost completely in the receiving slot 20 of the base body 5 and swivels there at an angle relative to the axial longitudinal extent. According to the invention, the coolant flows through this receiving slot 20, and as a result prevents the penetration of shavings, which would have a negative effect on the swivel path of the blade 6.

The spring action of the blade 6 for deburring bores or for chamfering bores occurs in the area of the blade neck 23 which has a flexible design and swivels in the receiving slot 20. In the mechanical equivalent diagram, it is represented as a bending beam clamped in on one side.

Accordingly, the cutting head 7 can swivel in radial direction 52 into the receiving slot 20c on the front tip 36 of the base body 5, or it is held, spring loaded, in the deburring or contact position shown in FIG. 3, and is thus moved with its cutting head 7 radially outward so that it protrudes over the tip 36.

FIG. 3 moreover shows, also diagrammatically, a workpiece 34 with a bore 35, through which the cutting head 7 can be moved, wherein the bore 35 is deburred or chamfered in the rearward movement on the bore margin.

Figure 4:
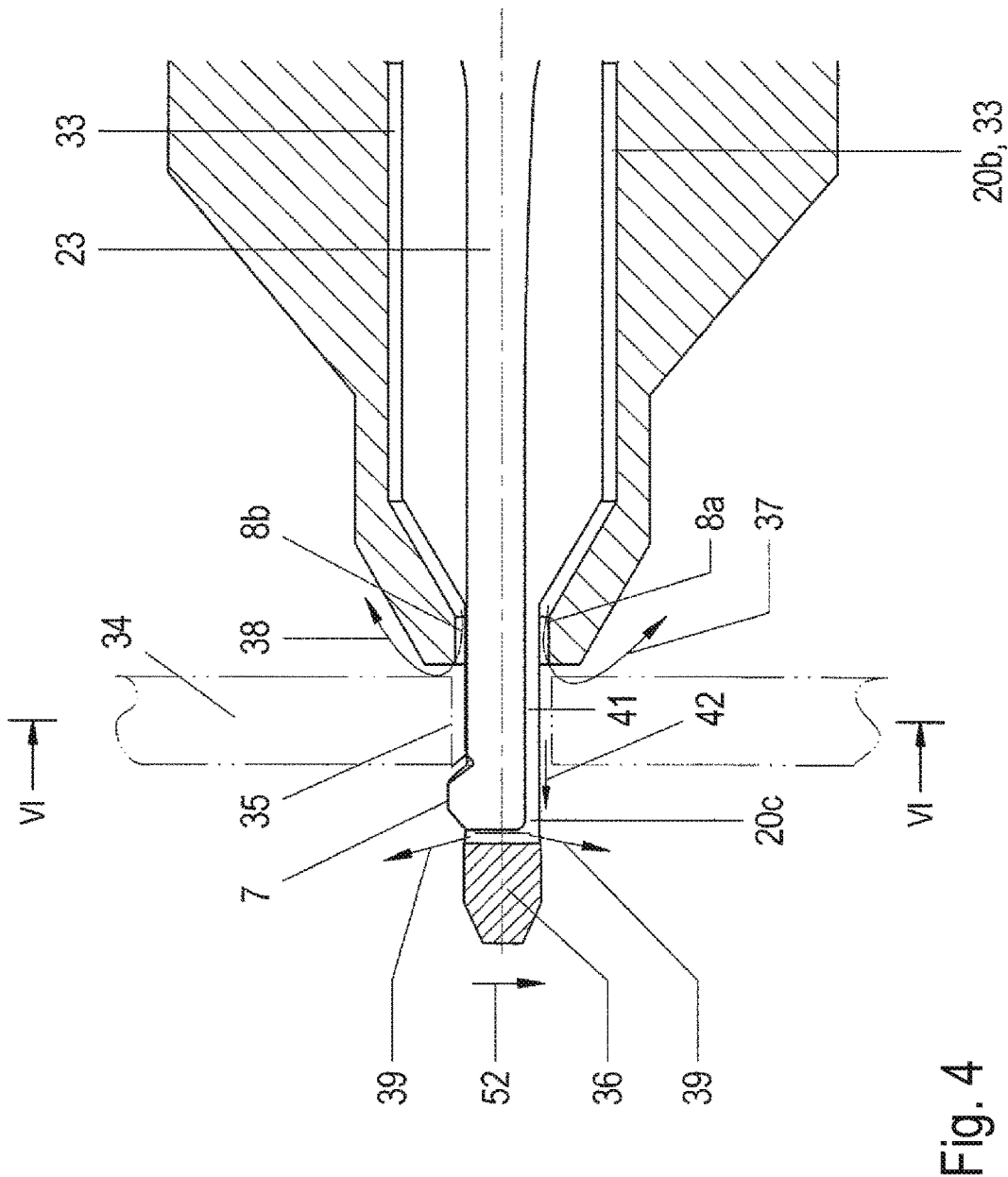
FIG. 4 shows: an enlarged detail representation of the cutting head of the tool according to FIG. 3

FIG. 4 shows, in an enlarged representation, the detail according to FIG. 3 with the coolant guidance in the area of the cutting head. There, one can see that the channel 33 narrows conically in the forward direction and forms a passage opening 8b, wherein one passage opening 8b is at the top and the other passage opening 8a is at the bottom. The design of the different passage openings 8a, 8b depends on the springiness of the blade neck 23.

If the blade neck 23 springs upward, then the upper passage opening 8a is open and the lower passage opening 8b is substantially closed.

On the other hand, if the blade neck 23 springs downward in arrow direction 52, then the lower passage opening 8b opens and the upper passage opening 8a closes.

It is also indicated that the passage openings 8a, 8b themselves are connected to one another on the periphery, resulting in an approximately oval shaping.

The flow channel 33 leads in a forward direction into the passage openings 8a, 8b, which are connected to one another on the periphery in a continuous and fluid conducting manner, so that at first a first coolant jet exits in arrow direction 38 from the passage openings 8a, 8b and then flows over the rear portion of the blade neck 23 keeping it free of shavings.

In this manner, in this area, the entire receiving slot 20, by means of which the blade neck 23 sits on the base body 5, is rinsed free, so that no shavings can collect there. The arrow direction 38 is located behind the workpiece bore 35.

However, the coolant jet continues in arrow direction 42 and flows through a longitudinal channel 41 formed by the outer periphery of the blade 6 and the receiving slot 20c in the base body 5.

Thus, the coolant jet also flows out directly at the front in the gap between the cutting head 7 and the tip 36 of the base body, in particular in the arrow direction 39 drawn there, at a slant forward in radial and also in axial direction. In this manner, it is ensured that, in this area, no shavings and no soiling can be deposited, because there is a fluid conducting connection of the coolant up to the tip 36 of the base body 5, wherein the coolant flows along both over the base body 5 at its outer periphery and also in the inner area over the receiving slot 20, 20a, 20b, 20c, resulting in an internal cooling according to the invention.

In FIG. 5, a cross section offset by 90° in comparison to FIG. 3 is represented, in which the coolant guidance can be seen. The coolant, which flows in arrow direction 18 around the blade holder base body 5, flows forward over a flat portion 40 of the blade holder base body 5 at the outer periphery of the blade holder base body 5, and it arrives over the one longitudinal channel 41 which is formed by the flat portion 40 and the inner periphery of the guide sleeve 2. The coolant flows forward until it reaches the peripherally extending annular space 31, where the coolant is distributed over the entire periphery of the blade holder base body 5 and thus also penetrates into the receiving slot 20.

Thus, from the annular space 31 on, the receiving slot 20b and the fluid-conducting receiving slot 20c adjoining it for the movable accommodation of the blade 6 are rinsed in axial direction.

It is also shown that the coolant flows out behind the bore in arrow direction 38 and also in front of the bore in arrow direction 39.

Since the coolant outflow behind the bore depends on the springiness of the cutting head 7, the arrow direction 38 was differentiated from the arrow direction 37, since the coolant exits in different quantities in these areas depending on the time.

Leaving off the body edges of the tool, FIG. 5a shows only the coolant guidance in a highly simplified form. The coolant is thus led forward in axial arrow direction 18 through the central coolant channel 19, against the rear end side of the blade holder base body 5. There, the coolant flow is divided into two coolant flows separated from one another, wherein a lower coolant flow flows into the longitudinal channel 41 which is formed by the flat portion 40 on the blade holder base body 5 and the facing surface of the guide sleeve 2.

The other portion of the coolant flows further into the receiving slot 20 in arrow direction 18, namely into the beginning of the receiving slot 20a in which the leaf-shaped blade 6 is movably mounted. The movement of the plate-shaped blades results from its bendability. There is no swiveling about a mounting shaft.

The coolant flow in the receiving slot 20 thus flows through all the parts 20a, 20b, 20c, which are connected together in an aligning and fluid conducting manner, of the receiving slot 20 in the blade holder base body 5, so that the bendable mounted blade 6 is exposed to peripheral flow from all four sides.

The front part 20c of the receiving slot 20 ends after the cutting head 7 of the blade 6, so that the front part 20c extends beyond the cutting head 7 and the coolant also flows in axial direction in front of the cutting head 7 out of the receiving slot 20c in arrow direction 39.

FIG. 5 also shows the path of the coolant flow which flows radially outward through the longitudinal channel 41 and leads into a peripherally extending annular space 31, and which flows in axial direction forward out through the longitudinal channels 33 which are formed by the outer periphery of the blade holder base body 5 and the inner periphery of the coolant sleeve 10. Thus, the coolant is guided forward at the outer periphery of the blade holder base body 5 in the peripherally extending flow channel 33 in the direction towards the outflow end, where it flows out of the coolant sleeve 10 in the arrow direction 37, 38 in front of the cutting head 7 of the blade 6.

Figure 6:
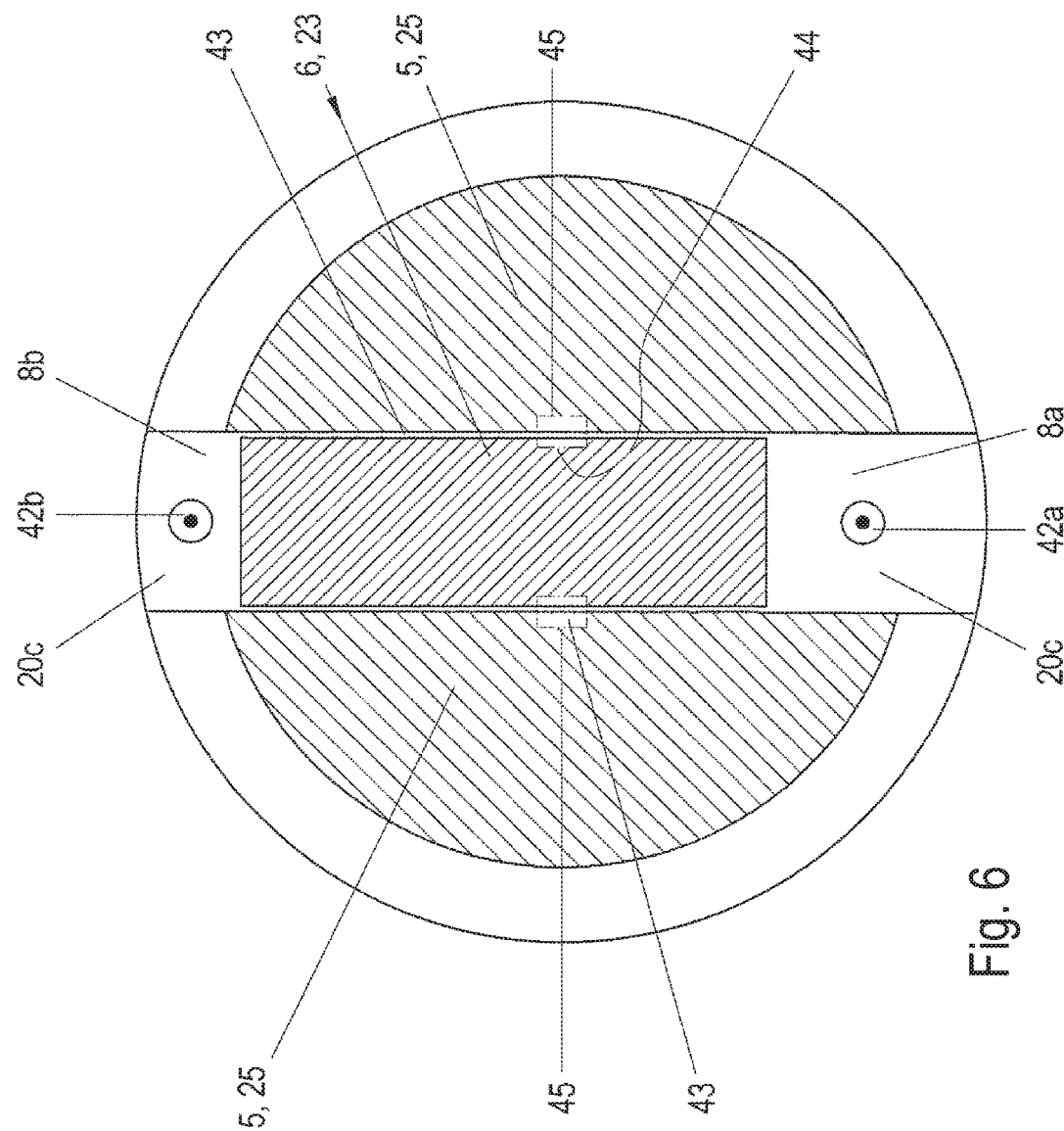
FIG. 6 shows: a cross section along line VI-VI in FIG. 4

FIG. 6 shows a cross section in the direction of the arrow VI-VI in FIG. 4 through the cutting head, where one can see that flow cross sections 20c are present due to the flattening of the blade neck 23 behind the cutting head 7. To simplify the drawing, the front view of the coolant sleeve 10 is not shown in the plane of the drawing of FIG. 6.

Furthermore, one can see that the coolant, next to the large-surface flow cross sections, drawn at 8b, flows out in arrow direction 42a, 42b perpendicularly to the plane of the drawing.

It is also shown that, in the lateral areas, where the mounting and movement guidance of the blade 6 occurs, additional passage cross sections 43 are present, through which coolant flows as well. Thus, the guiding surfaces for guiding the blade 6 are also rinsed in axial direction.

In a refinement of the invention, it is possible to provide that, in the blade holder base body 5, in the direction of the passage cross section 43, which is designed to be relatively small for the guidance of the blade 6, additional longitudinal ribs 45 can also be provided for the guidance of the flow of the coolant.

In addition to these longitudinal ribs 45 or instead of the longitudinal ribs 45, it is also possible to provide, in another embodiment, that in the blade 6 itself, and namely in the area of the blade neck 23, longitudinal ribs 44 that are open towards the outside are also arranged, which can be complementary with the base body-side longitudinal ribs 45 or are arranged separately.

The depicted features with reference numerals 43, 44, 45 are only represented in broken lines, since they may be present in an optional form. However, they can also be omitted.

FIG. 7 shows a cross section along line VII-VII in FIG. 3, where, a cut is made through the neck of the coolant sleeve 10 on the guide sleeve 2. The guidance of the coolant along the blade holder base body 5 will be explained once more.

One can see that the blade holder base body 5 can have a flat portion 40, so that the coolant flows along in the longitudinal channel 41 formed thereby. The longitudinal channel is formed by the outer periphery of the flattened portion of the base body 5 and the inner periphery of the guide sleeve 2.

Instead of or in addition to providing one or more flat portions 40 on the outer periphery of the blade holder base body 5, the other features described below can also be provided.

It is only represented in broken lines that, on the outer periphery of the blade holder base body 5, additional longitudinal channels 50 which are completely continuous in longitudinal direction can be provided, or that, instead of the longitudinal channels 50, one or more longitudinal channels 49 are arranged on the inner periphery of the guide sleeve 2.

It is also possible to provide, in another representation, that the longitudinal channels 49, 50 face one another thus forming the largest possible passage cross section for the coolant.

Likewise, it is possible to provide that the longitudinal channels 49, 50 are arranged evenly distributed over the periphery.

FIG. 9 shows, in an enlarged representation, a preferred embodiment of a blade, as already explained in reference to FIG. 2.

In FIG. 9, the cutting head 7 is represented enlarged, where one can see that the cutting surface 46 is arranged extending at a slant and that it is mounted above a free surface 47.

The cutting surface 48 adjoins the free surface 47 at an angle.

In FIG. 10, identical parts and functions are provided with the same reference numerals.

FIG. 10 shows, as additional embodiment example, another tool for deburring and for introducing chamfers, in which the rotatably mounted blade 54 is pushed or pulled in radial direction in or out of a cylindrically shaped blade holder 55. This occurs due to the force of a flexible spring 53 and the guiding of the flexible spring 53 in a longitudinal channel 56 in the blade holder 55. The coolant 57 is guided in arrow direction 58 onto the blade window 59 in the longitudinal channel 56. Along the cross section line VI-VI in FIG. 10, this results in the same flow geometry as described above in reference to FIG. 6. The coolant channel 19 is designed as a double channel and the two channels are guided so that they face one another radially outward from the central bore. In the central bore, the guidance of the flexible spring 53 is arranged.

Thus, it is clear from the embodiment example of FIGS. 3 and 10, that the invention is not limited to a miniaturized deburring tool with a leaf-shaped blade whose cutting head is movably pretensioned via a flexible blade neck, but that the invention instead also relates to other deburring and chamfering tools with larger outer diameter each allowing a guidance of the coolant in the guide sleeve in the direction of the blade window.

LEGEND FOR THE DRAWINGS

1 Tool
2 Guide sleeve
3 Bore
4 Tensioning screw
5 (Blade holder) base body
6 Blade
7 Cutting head
8 Passage opening *a, b*
9 Arrow direction
10 Coolant sleeve
11 Neck (of 10)
12 Neck (of 2)
13 Accommodation
14 Securing neck (of 5)
15 Annular groove
16 Stop
17 Coolant inlet
18 Arrow direction
19 Coolant channel
20 Receiving slot *a, b, c*
21 Indentation
22 Leaf body
23 Blade neck
24 Part (of 5)
25 Part (of 5)
26 Transverse bolt
27 Receiving thread (of 10)
28 Cone (of 10)
29 Conical neck
30 Free space
31 Annular space
32 Arrow direction
33 Flow channel
34 Workpiece
35 Bore
36 Tip (of 5)
37 Arrow direction
38 Arrow direction
39 Arrow direction
40 Flat portion
41 Longitudinal channel
42 Arrow direction *a, b*
43 Passage cross section
44 Longitudinal rib (of 6)
45 Longitudinal rib (of 5)
46 Cutting edge
47 Free surface
48 Cutting surface
49 Longitudinal channel (in 2)
50 Longitudinal channel (in 5)
51 Conical neck
52 Arrow direction
53 Flexible spring
54 Blade
55 Blade holder
56 Longitudinal channel
57 Coolant
58 Arrow direction
59 Blade window

The invention claimed is:

1. Miniaturized deburring and/or chamfering tool with a cylindrical guide sleeve in which a blade holder base body is arranged in an exchangeable manner, which has at least one receiving slot for receiving and guiding a blade arranged there, which is leaf-shaped and designed so that it can bend along its longitudinal axis, and which, at its free front end, has a cutting head with a deburring or chamfering blade arranged there, the leaf-shaped blade configured to permit movement of the cutting head generally radially relative to a longitudinal axis of the tool out of the slot to an extended deburring/chamfering position and into the slot to a retracted non-deburring/chamfering position, wherein an internal cooling of the blade and removal of shavings from the blade are achieved by coolant flowing around the blade in the receiving slot on at least two facing sides.

2. Deburring or chamfering tool according to claim 1, wherein coolant flows at least partially around and/or through the blade holder base body of the tool, which receives the deburring or chamfering blade, in a longitudinal direction and on its outer periphery, in that the deburring or chamfering blade is designed as leaf-shaped and is received bendably in the at least half-open receiving slot of the blade holder base body, and in that the coolant is streamed through the receiving slot.

3. Deburring or chamfering tool according to claim 1 or 2, wherein a coolant sleeve for guiding the coolant is provided, which encloses a front tool portion like a sleeve.

4. Deburring or chamfering tool according to claim 3, wherein the coolant sleeve is designed at a front passage opening thereof so that both a coolant flow directed in an axial direction and also a coolant flow directed in a radial direction are expelled.

5. Deburring or chamfering tool according to claim 4, wherein the coolant flow exiting the passage opening of the coolant sleeve in the axial direction is directed against a bore to be machined.

6. Deburring or chamfering tool according to claim 5, wherein the coolant also flows around the blade holder base body in the axial direction on all four sides over an entire periphery thereof.

7. Deburring or chamfering tool according to claim 3, wherein the coolant sleeve is attached detachably to a neck of the guide sleeve of the tool.

8. Deburring or chamfering tool according to claim 7, wherein the coolant sleeve encloses the blade holder base body at least on the tip side and forms only a front, end-side passage opening for the outlet of the coolant.

9. Deburring or chamfering tool according to claim 1, wherein the coolant is led in an axial direction through a central coolant channel forward, against a rear end side of the blade holder base body, and there it can be divided into two coolant flows separated from one another, wherein one coolant flow flows into a longitudinal channel, which is formed by a flat portion on the blade holder base body and a facing surface of the guide sleeve.

10. Deburring or chamfering tool according to claim 9, wherein the other coolant flow is introduced in an axial direction into a start of the receiving slot in which the leaf-shaped blade is movably mounted.

11. Deburring or chamfering tool according to claim 1, wherein the blade holder base body has two blades therein, the respective cutting heads of which are diametrically opposed.

12. Deburring or chamfering tool according to claim 1, wherein the blade includes a notch therein and the base body includes a cross bolt therein, the notch receiving the cross bolt to secure the blade against axial displacement.

\* \* \* \* \*